United States Patent
Kolu et al.

(10) Patent No.: US 7,054,781 B2
(45) Date of Patent: May 30, 2006

(54) RADIO CHANNEL SIMULATION

(75) Inventors: Janne Kolu, Oulu (FI); Pekka Kyösti, Jokirinne (FI); Patrick Jourdan, Jona (CH); Tommi Jämsä, Oulu (FI); Ari Hulkkonen, Oulu (FI)

(73) Assignee: Elektrobit OY, Oulu (FI)

( * ) Notice: Subject to any disclaimer, the term of this patent is extended or adjusted under 35 U.S.C. 154(b) by 78 days.

(21) Appl. No.: 10/853,900

(22) Filed: May 25, 2004

(65) Prior Publication Data

US 2005/0267715 A1 Dec. 1, 2005

(51) Int. Cl.
*G06F 19/00* (2006.01)

(52) U.S. Cl. .................... 702/122; 703/13; 702/57; 702/65; 370/241; 375/224; 455/115.1; 455/423

(58) Field of Classification Search .............. None
See application file for complete search history.

(56) References Cited

U.S. PATENT DOCUMENTS

| | | | | |
|---|---|---|---|---|
| 5,596,570 A | * | 1/1997 | Soliman | 370/252 |
| 5,987,328 A | * | 11/1999 | Ephremides et al. | 455/446 |
| 6,052,584 A | * | 4/2000 | Harvey et al. | 455/423 |
| 6,058,261 A | * | 5/2000 | Rapeli | 703/6 |
| 6,128,589 A | * | 10/2000 | Lilly | 703/13 |
| 6,188,356 B1 | * | 2/2001 | Kitayoshi | 342/451 |
| 6,600,926 B1 | * | 7/2003 | Widell et al. | 455/446 |
| 6,934,555 B1 | * | 8/2005 | Silva et al. | 455/522 |

OTHER PUBLICATIONS

Poutanen et al., "Correlation Control in the Multichannel Fading Simulators", IEEE, 2001.*
Heinanen et al., "Multipath Fading Simulation for Design Verification in Digital Basebadn Domain", IEEE, 2000.*
Kolu et al., "A Real-Time Simulator for MIMO Radio Channels", IEEE, 2002.*
Jamsa et al., "Implementation Techniques of Broadband Radio Channel Simulators", IEEE, 2001.*
Jamsa et al., "Real-Time Simulation of Adaptive Array Antenna Using Broadband Vector Channel Simulator", IEEE, 2002.*
Tsukamoto et al., "A Complex Baseband Platform for Spatial-Temporal Mobile Radio Channel Simulations", IEEE, 2002.*
Damosso et al., "Indoor Propagation Measurements: Application to Mobile Channel Modelling", IEEE, 1993.*
J. Kolu et al., "Real Time Simulation of Measured Radio Channels", *IEEE*, VTC Fall 2003, Orlando, Florida, USA, Oct. 6-9, 2003.

* cited by examiner

*Primary Examiner*—Patrick J. Assouad
(74) *Attorney, Agent, or Firm*—Hoffmann & Baron, LLP

(57) ABSTRACT

At least one radio channel is measured and stored. At least one simulation is performed with the at least one radio channel stored.

28 Claims, 7 Drawing Sheets

RADIO CHANNEL SIMULATION

FIELD OF THE INVENTION

The invention relates to a radio channel simulation.

BRIEF DESCRIPTION OF THE RELATED ART

When a radio frequency signal is transmitted from a transmitter to a receiver, the signal propagates in a radio channel along one or more paths having different signal phases and amplitudes, which causes fadings of different duration and strength in the signal. In addition, noise and interference caused by other transmitters interfere with the radio connection.

A radio channel can be tested either in real circumstances or by using a radio channel simulator simulating real circumstances. Tests performed in real circumstances are cumbersome, since tests carried out outdoors, for example, are subject to uncontrollable phenomena, such as the weather and the time of the year, which change continuously. In addition, a test carried out in one environment (city A) is not totally valid in a second, corresponding environment (city B). Thus, the repeatability of a real test is poor and the tests are time consuming increasing costs and the time required to enter the market. Additionally, testing a mobile device hooked up with large debug equipment is cumbersome, if not impossible.

A simulator simulating a radio channel can be used very freely to simulate a radio channel. In a digital radio channel simulator, a channel is usually modelled with a FIR filter (Finite Impulse Response), which provides convolution between the modelled channel model and an applied signal by weighting the signal, delayed by different delays, with channel coefficients, i.e. tap coefficients, and by summing the weighted signal components. A random number generator provides channel coefficients emulating the statistical values of a real channel.

However, there are problems related to the channel models used in simulators. The channel models are based on statistical analyses of measured channels, which make the models limited with respect to real channels. Additionally, only a few channel models have been developed for broadband systems so far and the models tend to be drastically simplified leading to too optimistic results. Moreover, depending on the environment, the frequency range, the bandwidth and the antenna construction suitable for radio channel models may not be available at all.

SUMMARY OF TILE INVENTION

An object of the invention is to provide an improved method of forming a simulated radio channel, a radio channel simulation method of a radio channel, a measurement set-up for measuring a radio channel and an arrangement for radio channel simulation. According to an aspect of the invention, there is provided a radio channel simulation method of a wireless communication system, the method comprising measuring at least one radio channel, storing the at least one radio channel measured, and performing digitally at least one simulation with the at least one radio channel stored.

According to another aspect of the invention, there is provided a method of forming a radio channel of a wireless communication system, the method comprising transmitting a signal from a transmitter to a receiver in at least one radio channel of a wireless communication system during a period of time, forming samples of the signal received by the receiver in a digital form, and saving the samples to be used to characterise a temporal and/or spatial behaviour of at least one simulated radio channel in a digital radio channel simulation.

According to another aspect of the invention, there is provided a simulation method of a radio channel of a wireless communication system, the method comprising transmitting a signal from a transmitter to a receiver in at least one radio channel of the wireless communication system during a period of time, forming parameters characterising a temporal and/or spatial behaviour of at least one simulated radio channel based on the signal transmitted and the signal received during the period of time, and performing at least one simulation with the parameters characterising the temporal and/or spatial behaviour of the at least one simulated radio channel.

According to another aspect of the invention, there is provided an arrangement for a radio channel simulation of a wireless communication system, the arrangement comprising a measurement set-up for measuring at least one radio channel and for storing the at least radio channel measured, and a simulator for performing digitally at least one simulation with the at least one radio channel stored.

According to another aspect of the invention, there is provided a measurement set-up for measuring a radio channel of a wireless communication system, the arrangement comprising a transmitter and a receiver, the transmitter transmitting a signal to the receiver in at least one radio channel of a wireless communication system during a period of time, a converter for forming digital samples of the signal received by the receiver, and a memory for saving the samples to be used to characterise a temporal and/or spatial behaviour of at least one simulated radio channel in a digital radio channel simulation.

According to another aspect of the invention, there is provided a measurement set-up of a radio channel simulation of a wireless communication system, the measurement set-up comprising a transmitter and a receiver, the transmitter transmitting a signal to the receiver in at least one radio channel over an air interface of a wireless communication system during a period of time, a filter for forming parameters characterising a temporal and/or spatial behaviour of at least one simulated radio channel based on the signal transmitted and the signal received during the period of time, and a simulator performing at least one simulation with the parameters characterising the temporal and/or spatial behaviour of the at least one simulated radio channel.

According to another aspect of the invention, there is provided an arrangement for a radio channel simulation of a wireless communication system, the arrangement comprising means for measuring at least one radio channel, means for storing the at least one radio channel measured, and means for performing digitally at least one simulation with the at least one radio channel stored.

According to another aspect of the invention, there is provided a measurement set-up for measuring a radio channel of a wireless communication system, the arrangement comprising means for transmitting, means for receiving, the means for transmitting being configured to transmit a signal to the means for receiving in at least one radio channel over an air interface of a wireless communication system during a period of time, means for forming digital samples of the signal received by the receiver, and means for saving the samples to be used to characterise a temporal and/or spatial behaviour of at least one simulated radio channel in a digital radio channel simulation.

According to another aspect of the invention, there is provided an arrangement of a radio channel simulation of a wireless communication system, the arrangement comprising means for transmitting, means for receiving, the means for transmitting being configured to transmit a signal to the means for receiving in at least one radio channel over an air interface of a wireless communication system during a period of time, means for forming parameters characterising a temporal and/or spatial behaviour of at least one simulated radio channel based on the signal transmitted and the signal received during the period of time, and means for performing a simulation with the parameters characterising the temporal and/or spatial behaviour of the at least one simulated radio channel.

The invention provides several advantages. The simulation can be performed repeatedly using a realistic radio channel instead of random channel coefficients and simplified channel models.

BRIEF DESCRIPTION OF THE DRAWINGS

In the following, the invention will be described in greater detail with reference to the embodiments and the accompanying drawings, in which.

DETAILED DESCRIPTION OF THE PREFERRED EMBODIMENTS

The present solution is suitable for the channel simulation of a broadband radio frequency signal (RF signal). Examples of the applications include, for instance, WLAN (Wireless Local Area Network), wireless mobile communication systems, and various generations of radio systems, without, however, any restriction thereto.

In a WLAN system a special transceiver, called an access point, connects equipment of a user to a desired network, which is usually a wired network. The access point is often stationary whereas the equipment of the user can be mobile. One access point can serve a plurality of users within several tens or even hundreds of meters.

In a radio system, such as GSM (Global System for Mobile Communication), UMTS (Universal Mobile Telephone System), a base station of a network is in contact with one or more user equipment over an air interface. In a similar manner to the access point of the WLAN, the base station has usually a fixed location whereas the user equipment can be mobile. The base station can serve a plurality of users within up to tens of kilometers.

In these kind of applications, it is important to know what happens between antennas. For research, standardization and development, reliable and accurate models of radio channels are required and the models can be deducted from measurements of the real world channel. According to the present solution, the measurement results can be used as such or implicitly through model creation as to simulate and emulate the radio channel. The channel can be defined by an impulse response, the approximation of which can also be called a channel estimate.

Figure 1:
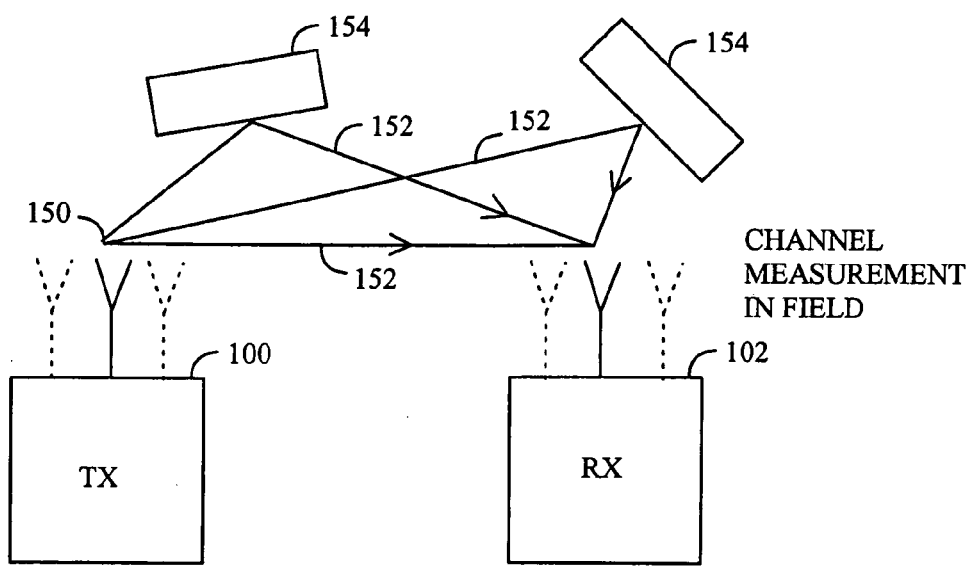
FIG. 1 shows a measurement of a radio channel.
Figure 2:
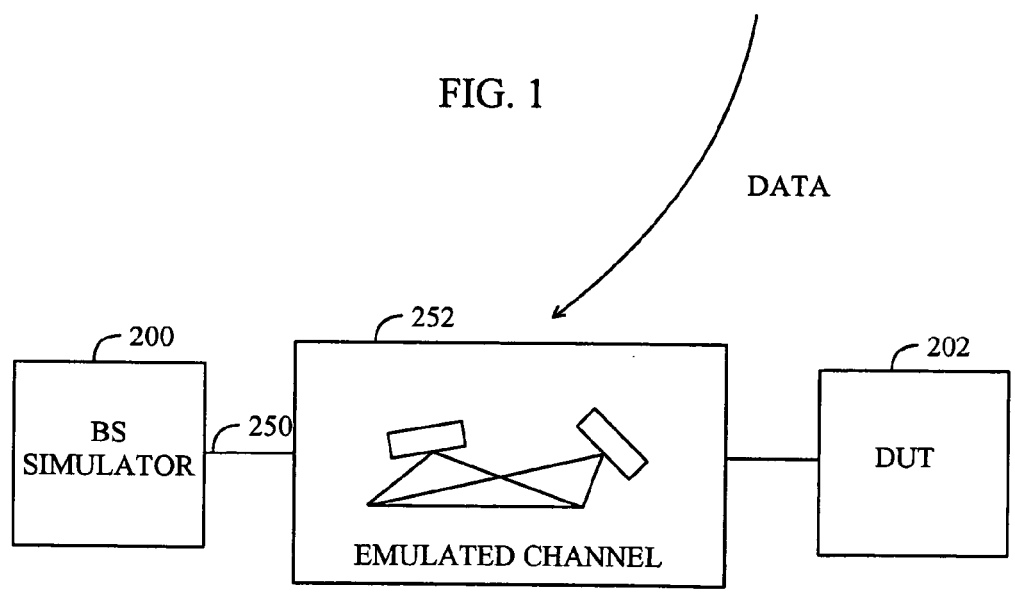
FIG. 2 illustrates a simulation utilizing the measurement of the radio channel.

With reference to FIGS. 1 and 2, examine now the basic principle of utilizing a measured radio channel in simulation. A channel sounder can measure at least one real-world radio channel in temporal and spatial domain and deliver information on the measurement to product development. As shown in FIG. 1, a transmitter 100 can transmit a signal 150 to a receiver 102 over an air interface. This can take place indoors or outdoors. The signal may propagate through several paths 152 because of reflection or diffraction caused by objects 154. The receiver 102 may store the received signal of each path. When a transmitted signal is known or available, it is possible to produce a characterizing temporal series of estimates of the radio channel between the transmitter 100 and the receiver 102 by comparing the transmitted signal and the received signal. Alternatively or additionally, it is possible to extract spatial characteristics of the radio channel from a plurality of impulse responses. The channel measurement can be based, for example, on the spread-spectrum sounding method for the delay domain. The spatial characteristics of the radio channel can include, for example, angle of arrival, angle of departure, azimuth angle, elevation angle etc.

In FIG. 2 the temporal series of the estimates and/or spatial characteristics of the at least one radio channel can be used in a simulated air interface of a simulation. A simulated transmitter 200 can transmit a signal or signals 250 to a receiver 202 of the simulation through the simulated air interface 252, which corresponds to the measured air interface in FIG. 1. This enables repeated use of realistic channels, or a certain part of any measured channel can be replayed over and over again, if necessary.

Figure 3:
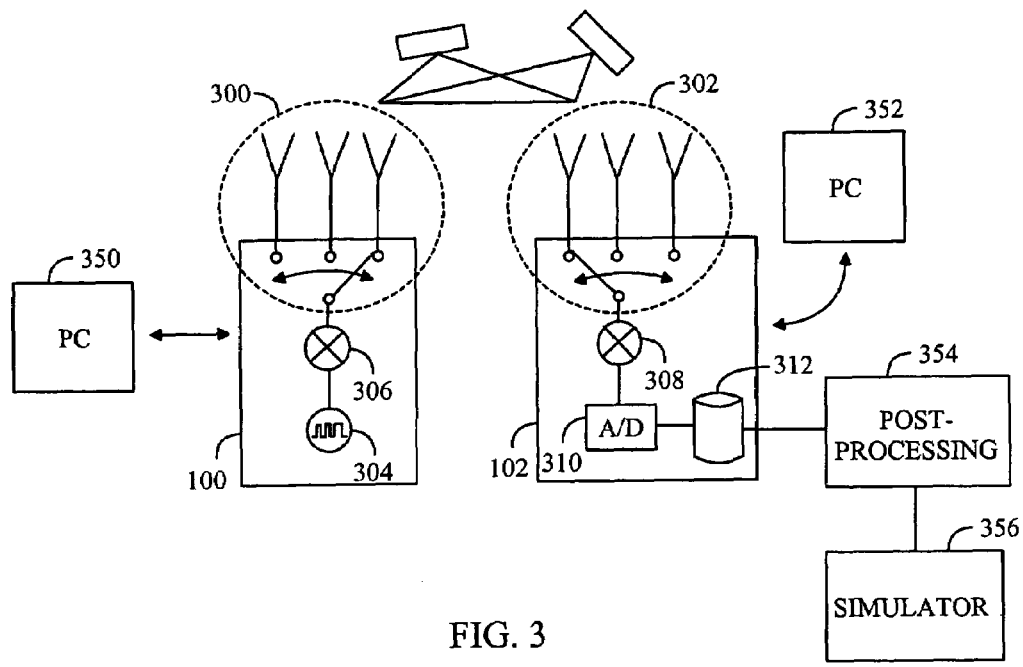
FIG. 3 illustrates the measurement set-up.

FIG. 3 shows more details of the measurement of the radio channel. To measure a certain channel, the measurement set-up is transported to a measurement location. The transmitter 100 can be installed in a moving vehicle or it can be installed fixedly. Since the receiver 102 of the measurement set-up may be stationary, it can be installed in an immobile place. However, the receiver 102 may also move. The antenna 300 of the transmitter 100 and the antenna 302 of the receiver 102 may consist of a single antenna element or an array of antenna elements such that at least one of the SISO (Single Input Single Output), SIMO (Single Input Multiple Output), MISO (Multiple Input Single Output) or MIMO (Multiple Input Multiple Output) channel measurements is possible. After switching on the transmitter 100 and the receiver 102, a short warm-up period (a few minutes) may be required before the measurement. The transmitter 100 and the receiver 102 can be calibrated and synchronized by connecting them together, for example, through a cable and matching their clocks, which may be very exact rubidium clocks.

After the set-up is ready, the measurement can start and the measurement of the at least one channel may continue for a desired period of time. The transmitter 100 may include a signal generator 304 which can be a periodic pseudorandom sequence generator for providing at least one desired signal. The signal of the generator 304, can then be up converted to a radio frequency signal in a mixer 306 before transmitting the signal through the antenna 300. The transmitter 100 can be connected to a computer 350, with which the operation of the transmitter can be monitored and controlled by the operator. For example, the transmission can be started and stopped by the operator using the computer 350. Outside the transmitter can be installed in a moving vehicle, such as a car, and during transmission the vehicle may be driven via a desired route when the receiver is stationary. During measurement the behaviour of the at least one channel can be recorded. Both the transmitter and the receiver can also be stationary in known places such that the measurement can record temporal and/or spatial behaviour of the at least one channel. Similar measurements can be made inside, for example, an office. Alternatively to the stationary measurement, the transmitter can be carried around the around the office according to a predetermined plan. The people moving in the office may have effect on the measured channels.

The receiver 102 down converts the signal received by the antenna 302 in a mixer 308. The down converted signal can then be transformed in a digital form in an A/D converter 310. Delay resolution of the measurement data can be matched to the needs. The digital samples of the received signal can be stored in a memory 312, which can be a mass storage such a hard disc or a storage tape, although the present solution has no special restriction with respect to the type of the memory. However, the measurement can result in up to tens of gigabits or even more. During the measurement the received signal can be sampled regularly and continuously. If required, the transmitter and the receiver can be brought together for an additional back-to-back calibration and synchronization. The next measurement can be started after the calibration.

The sampling rate of the impulse responses should be at least two times the maximum Doppler frequency shift of the velocity between the transmitter and the receiver. The Doppler frequency shift $f_D$ can be defined mathematically as $$f_D = f_c(v/c)\cos\theta, \tag{1}$$

where v is the velocity of the receiver with respect to the transmitter (or the velocity of the transmitter with respect to the receiver), c is the speed of electromagnetic radiation, θ is the angle between the direction of the transmission and the movement of the transmitter with respect to the receiver (or the movement of the receiver with respect to the transmitter), cos is the trigonometric cosine function and $f_C$ is the frequency of the signal transmitted.

The receiver 102 can be connected to a computer 352 with which the operation of the receiver can be monitored and controlled. For example, the measurement and storing the samples can be started and stopped by the operator using the computer 350. The measurement system may also include a real time display such that a set of measured samples can be input to the computer 352, which may process the samples and display an estimate of the channel. This enables to "see what you store".

The receiver 102 can also be connected to a post-processing device 354, which can be considered as a filter performing signal processing. The post-processing device 354 may process the received signal with a matched filter in order to form a sequence of impulse response estimates of each measured channel. The sequences represent the behaviour of the channel during the measurement period, and one temporal sequence of impulse response estimates corresponds to one radio channel. Also, spatial characteristics can be estimated by using information from a plurality of radio channels. The radio channel can be recorded at a constant rate such that the impulse response estimates are formed uniformly as a function of time. The recording rate of impulse responses may be tens of hertz or even higher. One radio channel is considered to be formed between an element of a transmitter antenna and an element of a receiver antenna.

The post-processing device 354 may also change the sampling of the impulse response estimates and the format of the impulse response estimates. Often the rate of impulse responses is increased by interpolation for simulation purposes in order to smooth phase changes between consecutive impulse response snapshots. The data interpolation factor can have any desired value, for instance 20. In this way the difference between two successive impulse responses cannot become too large, which would cause unwanted distortion of the signal.

The measured data typically contains a high number of propagation radio channel paths. The post-processing device 354 may decrease the number of paths, since the radio channel simulator usually has a certain limit for the maximum number of the processable paths.

It is possible to limit the number of paths in various ways. Some of the possibilities are, for example, the following filtering methods: minimum energy error, minimum delay spread error and minimum squared frequency response error.

Figure 4:
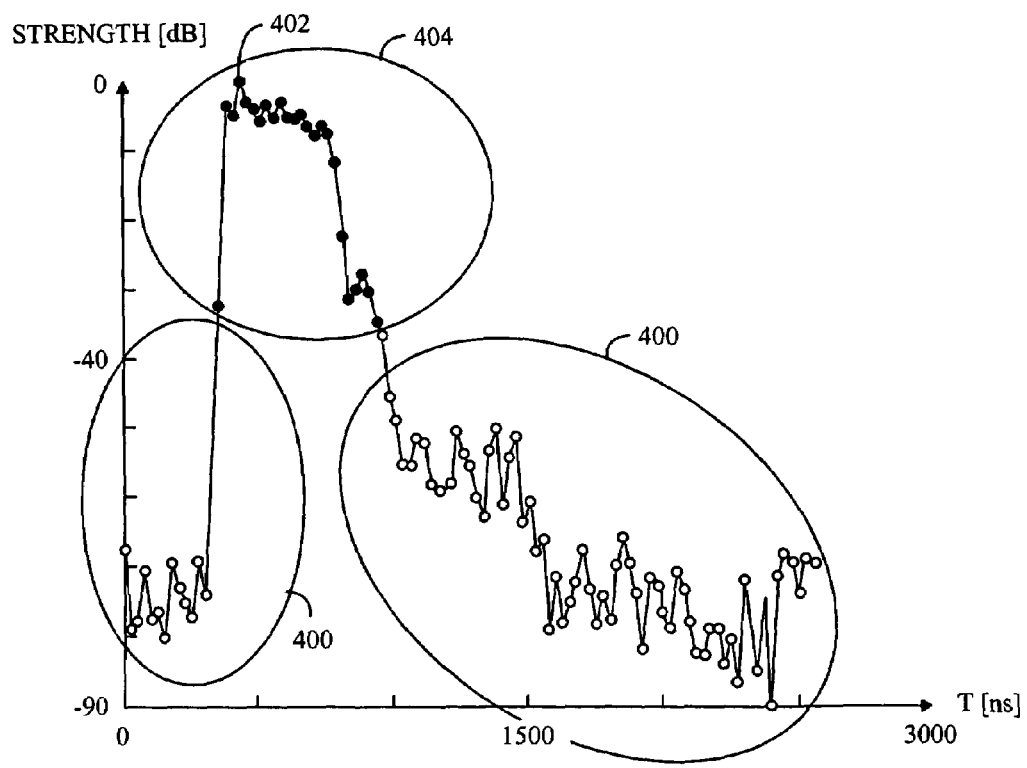
FIG. 4 illustrates a selection of paths of a channel.

According to the minimum energy error method, the post-processing device 354 can filter away all the paths 400 of each channel whose power level is small compared to the power of the path 402 having the maximum power. This is shown in FIG. 4. In this way the post processing device 354 may decrease the number of paths such that a limited number of the strongest paths 404 are selected and the least significant paths 400 are discarded.

Figure 5:
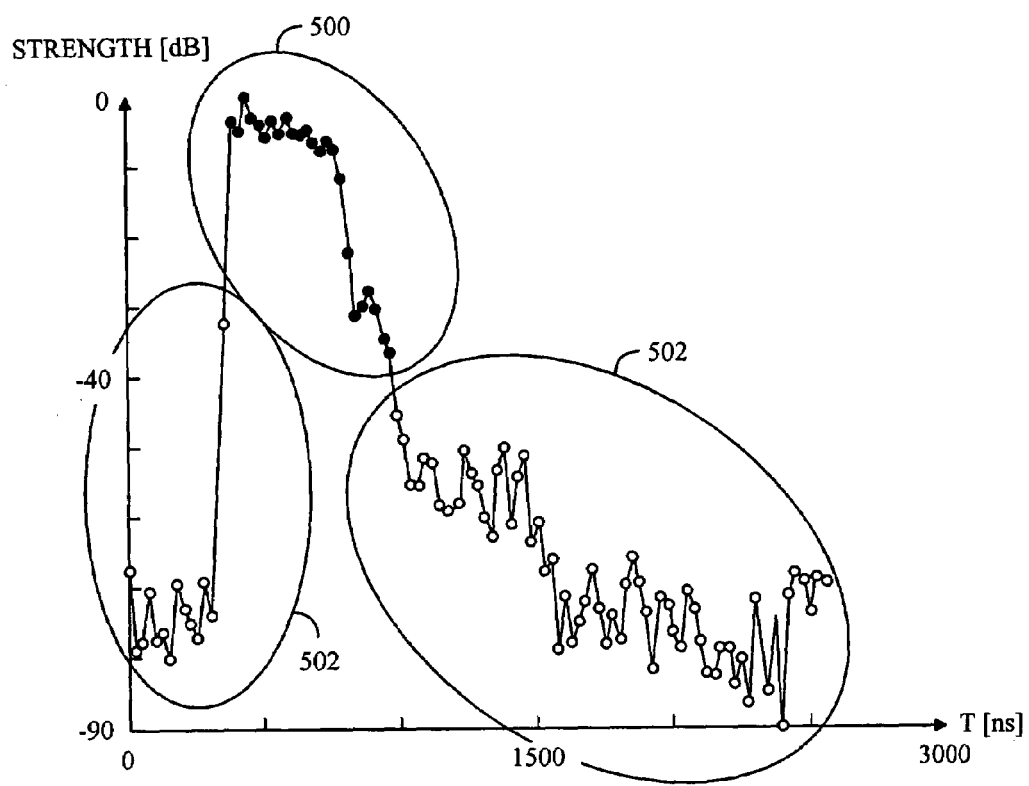
FIG. 5 illustrates a selection of paths of a channel.

According to the minimum delay spread error method, the post-processing device 354 minimizes the RMS delay spread error of the paths of each channel. This criterion gives more value to the paths having a large delay deviation even if their power is low. The RMS delay spread $\tau_{rms}$ can be defined as:

$$\tau_{rms} = \sqrt{\left(\sum_{k=0}^{M}(\tau_k - \tau_{av})^2 P(k) \bigg/ \sum_{k=0}^{M} P(k)\right)}, \tag{2}$$

where $\tau_k$ is a delay of a path, P(k) is power of the path and $\tau_{av}$ is the average delay of the paths, defined as:

$$\tau_{av} = \sum_{k=0}^{M} \tau_k P(k) \bigg/ \sum_{k=0}^{M} P(k), \tag{3}$$

where M is the number of the paths. This is shown in FIG. 5. In this way the post-processing device 354 may decrease the number of paths such that a limited number of mainly strongest paths 500 are selected and the least significant paths 502 are discarded. The propagation paths in the processed data are selected such that the error between the RMS delay spread of the measured data and the RMS delay spread of the processed data is minimized.

According to the minimum square frequency response error method, the post-processing device 354 minimizes the error between the filtered data and the original data in the frequency domain. An impulse response estimate h(τ) can be defined as $$h(\tau) = \sum_{k=0}^{M} c_k \delta(\tau - \tau_k),\quad(4)$$

where $c_k$ is a complex path coefficient of a $k^{th}$ path, M defines the number of values, $\tau$ is a delay, $\tau_k$ is a delay of the $k^{th}$ path and $\delta$ is Dirac delta function.

Figure 6:
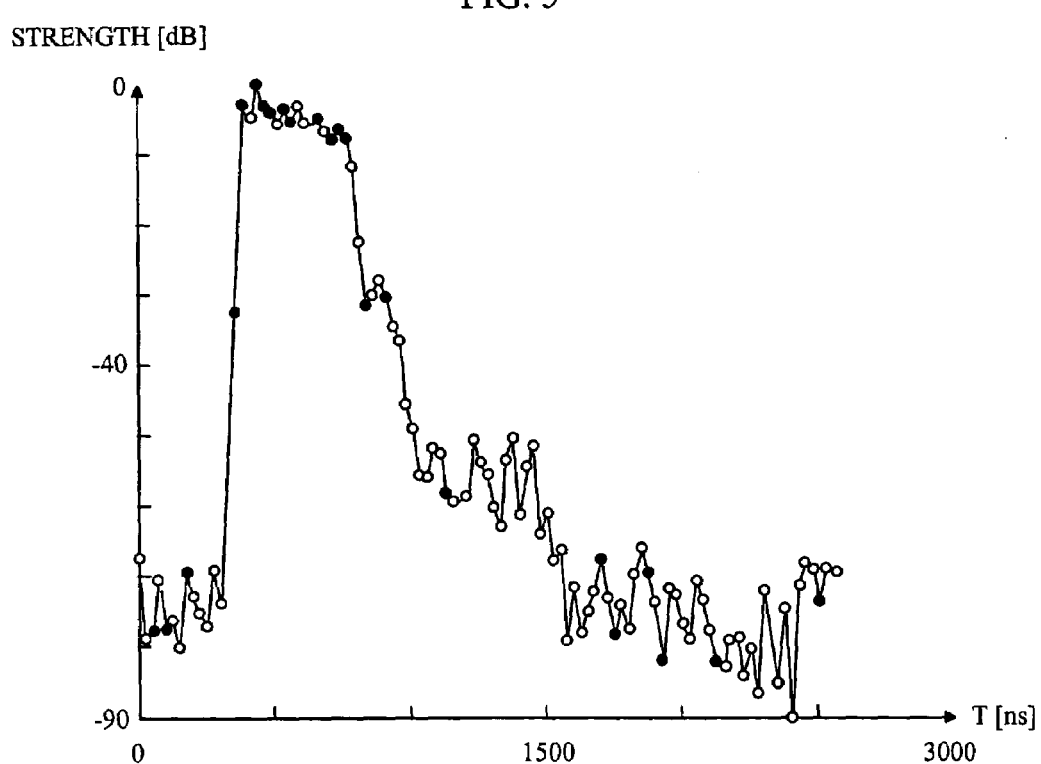
FIG. 6 illustrates a selection of paths of a channel.

The frequency response of the channel can be defined as $$H(f) = \sum_{k=0}^{M} c_k \exp(-j\omega\tau_k),\quad(5)$$

where $\omega = 2\pi f_C$ and $f_C$ is the carrier frequency. The frequency response is calculated using equation (5) for the original measured data and the processed data. The propagation paths in the processed data are selected such that the error between the frequency response of the measured data and the frequency response of the processed data is minimized. This is shown in FIG. 6. In this way the post-processing device 354 may select the paths marked with black dots the other paths being discarded.

The post-processing device 354 may form a file comprising data of the at least one measured channel based on the limited number of paths that pass the filtering. The file can then be transferred to a simulator 356, which has the simulated radio channel programmed to behave according to the data in the file. Hence, the simulator can perform a simulation digitally with the at least one radio channel stored. The simulation can be repeated as many times as desired.

Figure 7:
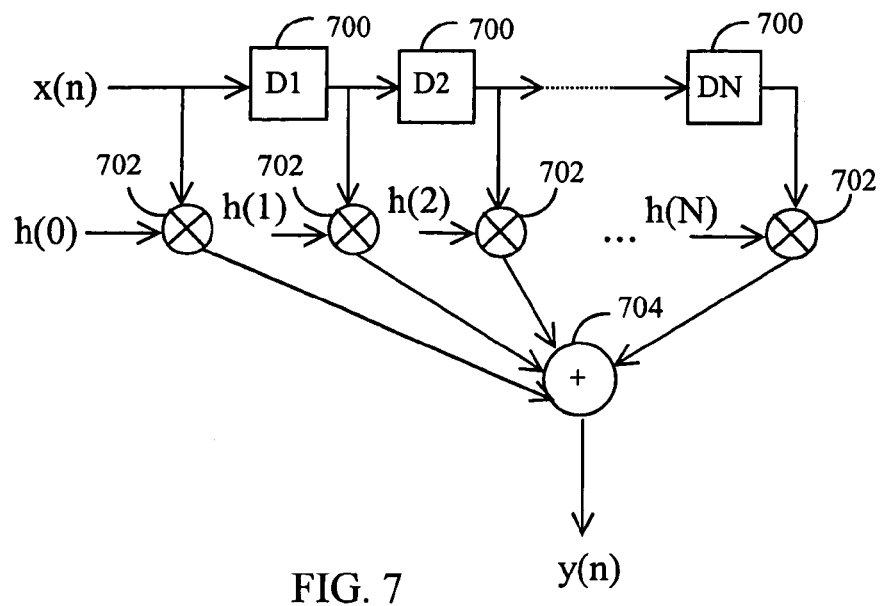
FIG. 7 illustrates a FIR filter.

In each channel simulator, a radio channel can be simulated, for instance, by means of a digital FIR filter, whose block diagram is shown in FIG. 7. The FIR filter comprises delay elements 700 arranged as a shift register, weight coefficient blocks 702 and a summer 704. An input signal x(n) is delayed in each delay element 700, whose delays may have the same or different length in time, and the delayed signals are weighted in the weight coefficient blocks 702 by the desired weight coefficient h(i), where i=[0, . . . , N]. The weight coefficients h=[h(0), . . . , h(N)] are channel estimates of the radio channel, also called tap coefficients of the FIR filter. The weight coefficients are changed in the same way as the characteristics of a real radio channel are measured to change. Usually weight coefficients are quite stable in the short run, but change slowly compared with the variation rate of the signal. The delayed and weighted signals are summed in a summer 704.

Generally, weight coefficients may be real or complex. Complex weight coefficients are often needed since a simulator may use quadrature modulation, wherein a signal is divided into two parts. The real signal part I (Inphase) is multiplied by a carrier without phase shift and the imaginary signal part Q (Quadrature) is multiplied by a phase shifted carrier. Thus signal x can be expressed in the form x=I+jQ, where I is the real signal part, Q is the imaginary signal part and j is an imaginary unit.

In mathematical form, the output signal y(n) of the FIR filter can be expressed as convolution of the sum of the product of the delayed signal and the weight coefficients:

$$Y(n) = x^* h = \sum_{k=1}^{N} h(k)x(n-k),\quad(6)$$

where * denotes a convolution operation and n denotes the index of a signal element. Signals x and y and channel impulse response estimate h can be processed in scalar form, in vector form or in matrix form.

Figure 8:
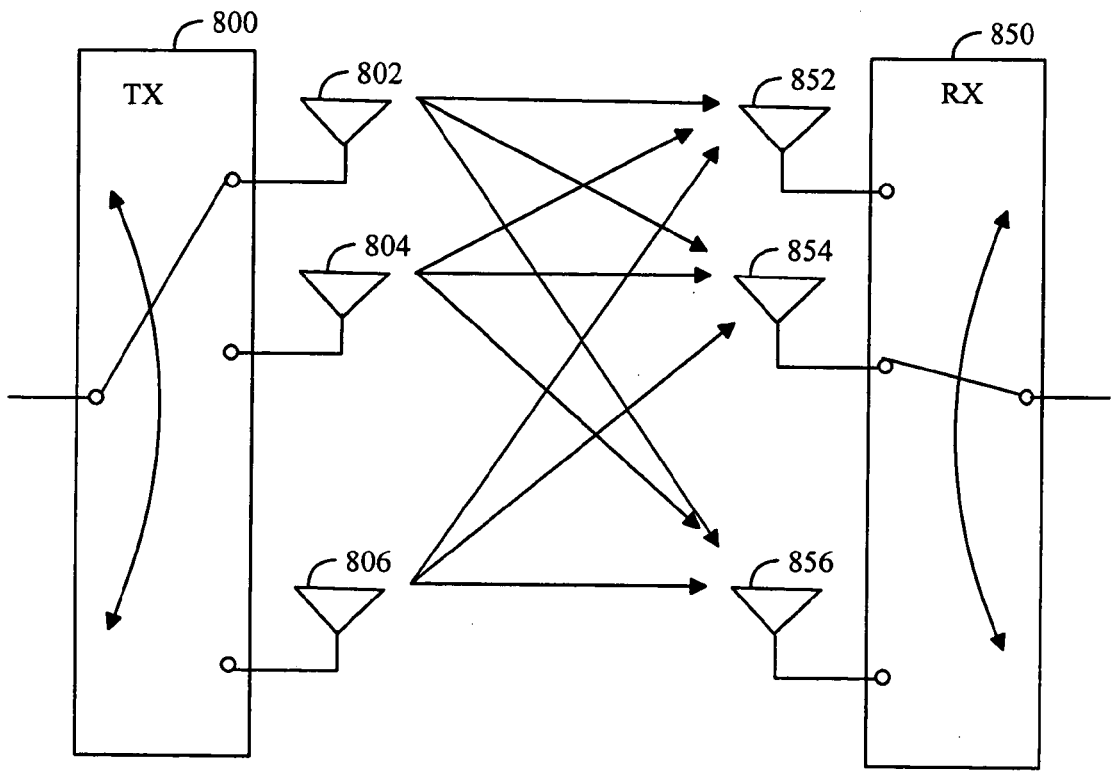
FIG. 8 illustrates MIMO antennas.

Other dimensions, like polarizations or FDD frequencies or spatial dimensions like arrays, can be measured using an advanced time-domain switching. FIG. 8 shows a configuration of MIMO antennas which enable this kind of measurements. The transmitter switch 800 switches between antenna elements 802 to 806 and when an antenna element 802 to 806 is switched, it is transmitting a signal. In a similar manner, the receiver switch 850 switches between antenna elements 852 to 856 and when an antenna element 852 to 856 is switched, it is receiving a signal transmitted from a transmitting antenna element 802 to 806. In this way any combination of transmitting antenna elements and receiving antenna elements can be selected and many channels can be measured. Each antenna element may be polarized in order to measure polarization properties of the channel between the transmitter and the receiver. An angle of departure/arrival can be determined on the basis of phase difference in different antenna elements and the Doppler shift can be determined using an equation $f_D = \Delta\phi/\Delta t$, where $\Delta\phi$ is a phase difference in a time difference $\Delta t$.

A SISO channel can be measured if, for example, the transmitter switch 800 is constantly coupled to the antenna element 802 and the receiver switch 850 is constantly coupled to the antenna element 852.

MISO channels can be measured if, for example, the transmitter switch 800 switches between at least two antenna elements 802 to 806 and the receiver switch 850 is constantly coupled to the antenna element 852.

SIMO channels can be measured if, for example, the transmitter switch 800 is constantly coupled to the antenna element 802 and the receiver switch 850 switches between at least two antenna elements 852 to 856.

MIMO channels can be measured if, for example, the transmitter switch 800 switches between at least two antenna elements 802 to 806 and the receiver switch 850 switches between at least two antenna elements 852 to 856.

The post-processing device 354 may output alone or in any desired combination, for example, channel characteristics, channel model parameters and a file including information on the channel needed in simulation. The impulse responses may be obtained from a matched filter or a correlator of the post-processing device 354.

The post-processing device 354 may cancel an effect of the transmitter (or a part of the transmitter) on the impulse response of the channel estimate because the transmitter (or a part of the transmitter) can be considered to have an impulse response $h_t$ of the channel. When a signal passes through the transmitter, the output is the convolution of the impulse response of the transmitter and the signal. By filtering the received signal with an inverse of the impulse response of the transmitter (or a part of the transmitter) $h_t^{-1}$, the effect of the transmitter (or a part of the transmitter) on the signal can be cancelled. Often the effect of a transmitter antenna is desired to be cancelled.

The post-processing device 354 may cancel an effect of the receiver (or a part of the receiver) on the impulse response estimate of the channel because the receiver (or a part of the transmitter) can be considered to have an impulse response $h_r$ of the channel. When a signal passes through the receiver, the output is the convolution of the impulse response of the receiver and the signal. By filtering the received signal with an inverse of the impulse response of the receiver (or a part of the transmitter) $h_r^{-1}$, the effect of the receiver (or a part of the transmitter) on the signal can be cancelled. Often the effect of a receiver antenna is desired to be cancelled.

After the effect, for example, of measurement antennas has been cancelled, an effect of another kind of antennas can be reembedded in the measured signal by performing a convolution of the impulse response of the antennas and the measured signal. In this way, the simulation can be performed using antennas which are considered to be used in the real system.

As an example, the measurement campaign can be performed such that the receiver is mounted on a wall of a building and the transmitter is mounted on the roof of a car which is driving a predetermined route at a speed of around 20 km/h. The transmitter antenna may be a cylindrical array of 28 dual polarized patches and the receiver antenna may be a 4×4 dual polarized patch array. The wide band measurement can be conducted in the 2.45 GHz band where some WLAN systems operate. Delay resolution of the measurement data can be, for example, 5 ns and corresponding path binning for 25 ns raster can be performed. That means that five samples of 5 ns resolution are averaged for one value of the impulse response estimate. In general, binning is not necessary, but if it is used, the number of samples averaged can be selected freely so that it is suitable for the application. The channel response can be measured at a constant rate which may be, for example, about 150 Hz.

Compared to the generation of random numbers, it is obvious that the coefficients based on the measured data simulate much better real radio channels. The coefficients provided by the random number generator are also difficult to control such that a desired kind of radio channel can be simulated.

Figure 9:
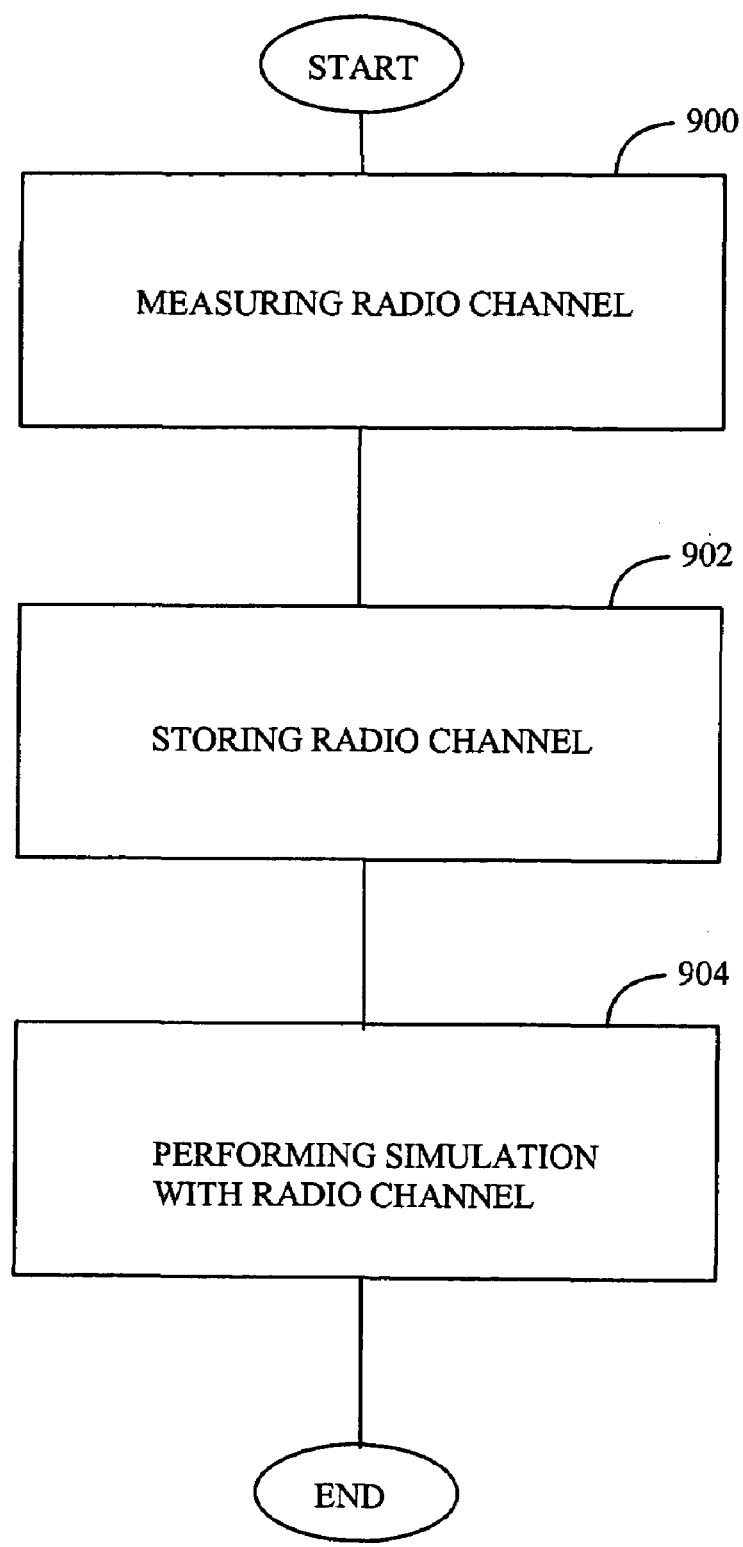
FIG. 9 illustrates a flow chart of the method.

FIG. 9 shows a flow chart of the method. In step 900, at least one radio channel is measured. In step 902, the at least one radio channel measured is stored, and in step 904 at least one simulation with the at least one radio channel stored is performed.

Figure 10:
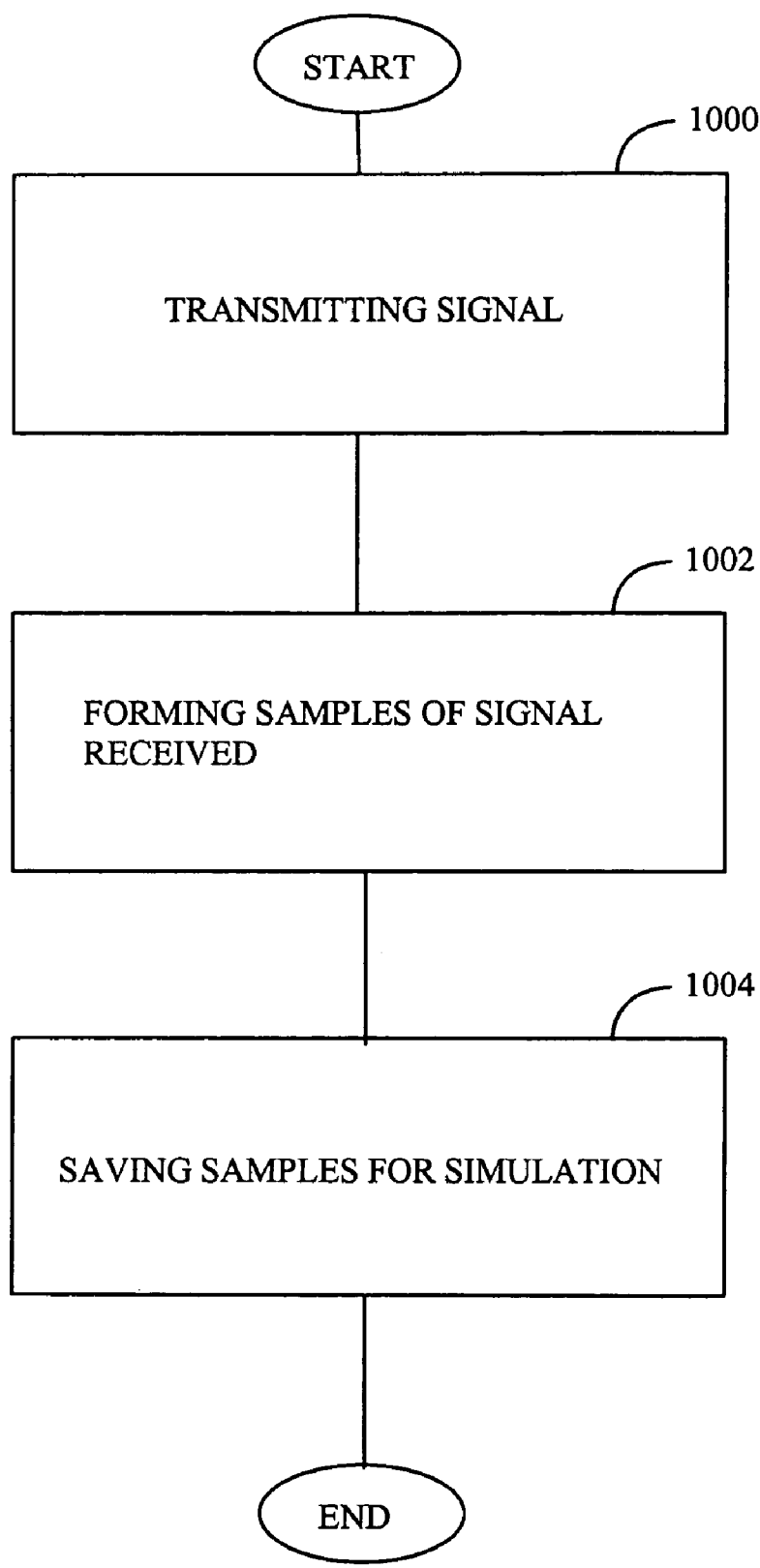
FIG. 10 illustrates a flow chart of the method.
Figure 11:
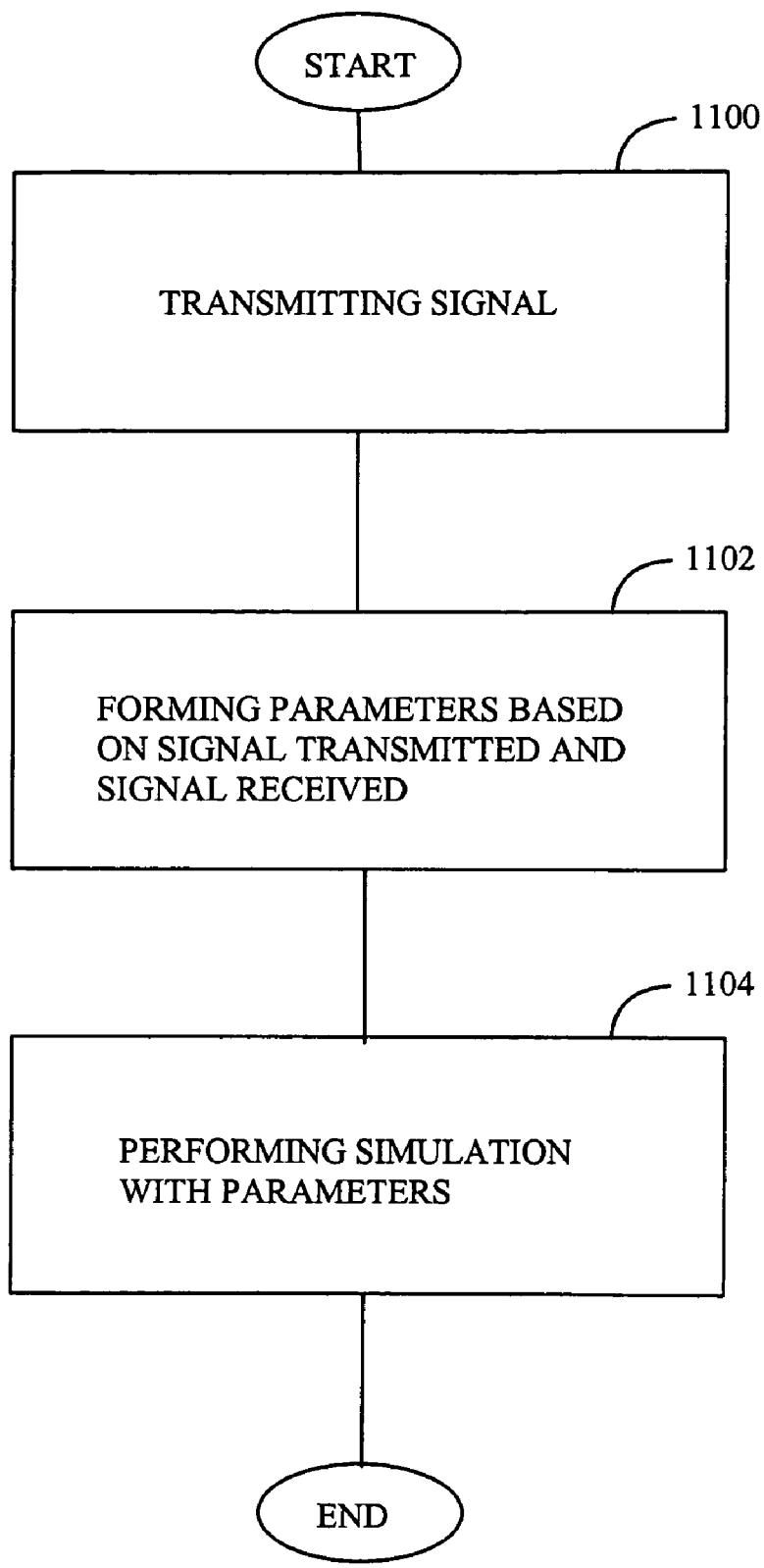
FIG. 11 illustrates a flow chart of the method.

FIG. 10 also shows a flow chart of the method. In step 1000, a transmitter transmits a signal to a receiver in at least one radio channel of a wireless communication system during a period of time. In step 1002, samples of the signal received by the receiver are formed in a digital form, and in step 1004, the samples to be used to characterise a temporal and/or spatial behaviour of at least one simulated radio channel in a digital radio channel simulation are saved:

FIG. 11 shows still another form of the flow chart of the method. In step 1100, a transmitter transmits a signal to a receiver in at least one radio channel of the wireless communication system during a period of time. In step 1102, parameters characterising a spatial and/or temporal behaviour of at least one simulated radio channel is formed based on the signal transmitted and the signal received during the period of time. In step 1104, at least one simulation is performed with the parameters characterising the temporal and/or spatial behaviour of the at least one simulated radio channel.

Even though the invention is described above with reference to examples according to the accompanying drawings, it is clear that the invention is not restricted thereto but can be modified in several ways within the scope of the appended claims.

What is claimed is:

1. A radio channel simulation method of a wireless communication system, the method comprising
measuring at least one radio channel,
storing the at least one radio channel measured, and
performing digitally at least one simulation with the at least one radio channel stored.

2. The method of claim 1, the method further comprising measuring the at least one radio channel as a function of time to define a temporal and/or spatial behaviour of the radio channel, and
performing at least one simulation according to the temporal and/or spatial behaviour of the radio channel.

3. A method of forming a radio channel of a wireless communication system, the method comprising
transmitting a signal from a transmitter to a receiver in at least one radio channel of a wireless communication system during a period of time,
forming samples of the signal received by the receiver in a digital form, and
saving the samples to be used to characterise a temporal and/or spatial behaviour of at least one simulated radio channel in a digital radio channel simulation.

4. The method of claim 3, the method further comprising the transmitter modulating the signal to be transmitted using quadrature modulation, and saving the samples of the quadrature modulation of the received signal.

5. A simulation method of a radio channel of a wireless communication system, the method comprising
transmitting a signal from a transmitter to a receiver in at least one radio channel of the wireless communication system during a period of time,
forming parameters characterising a temporal and/or spatial behaviour of at least one simulated radio channel based on the signal transmitted and the signal received during the period of time, and
performing at least one simulation with the parameters characterising the temporal and/or spatial behaviour of the at least one simulated radio channel.

6. The method of claim 5, the method further comprising forming temporal sequences of impulse response estimates and/or spatial characteristics as parameters of the at least one radio channel, and
performing a simulation with the sequences of impulse response estimates and/or spatial characteristics of the at least one simulated radio channel.

7. The method of claim 6, the method further comprising forming the impulse response estimates at a constant rate as a function of time.

8. The method of claim 6, the method further comprising forming samples of the at least one impulse response estimate, and
increasing the sample rate of the impulse response estimates by interpolation in order to limit a difference between two successive impulse response estimates.

9. The method of claim 6, the method further comprising forming the temporal sequences of the impulse response estimates and/or spatial characteristics using a matched filter or a correlator.

10. The method of claim 6, the method further comprising limiting the number of the propagation paths included in each impulse response of the radio channel and performing the at least one simulation using limited number of the propagation paths.

11. The method of claim 5, the method further comprising cancelling an effect of the transmitter on parameters characterising a temporal and/or spatial behaviour of at least one simulated radio channel.

12. The method of claim 5, the method further comprising cancelling an effect of the receiver on the parameters characterising a temporal and/or spatial behaviour of at least one simulated radio channel.

13. An arrangement for a radio channel simulation of a wireless communication system, the arrangement comprising
 a measurement set-up for measuring at least one radio channel and for storing the at least radio channel measured, and
 a simulator for performing digitally at least one simulation with the at least one radio channel stored.

14. The arrangement of claim 13, wherein the measurement set-up is configured to measure the at least one channel as a function of time to define temporal and/or spatial behaviour of the radio channel, and
 the simulator is configured to perform at least one simulation according to the temporal and/or spatial behaviour of the radio channel.

15. A measurement set-up for measuring a radio channel of a wireless communication system, the arrangement comprising
 a transmitter and a receiver, the transmitter transmitting a signal to the receiver in at least one radio channel of a wireless communication system during a period of time,
 a converter for forming digital samples of the signal received by the receiver, and
 a memory for saving the samples to be used to characterise a temporal and/or spatial behaviour of at least one simulated radio channel in a digital radio channel simulation.

16. The measurement set-up of claim 15, wherein the transmitter is configured to modulate the signal to be transmitted using quadrature modulation,
 the converter is configured to form digital samples of the quadrature modulation of the signal received, and
 the memory is configured to save the digital samples of the quadrature modulation of the signal received.

17. A measurement set-up of a radio channel simulation of a wireless communication system, the measurement set-up comprising
 a transmitter and a receiver, the transmitter transmitting a signal to the receiver in at least one radio channel over an air interface of a wireless communication system during a period of time,
 a filter for forming parameters characterising a temporal and/or spatial behaviour of at least one simulated radio channel based on the signal transmitted and the signal received during the period of time, and
 a simulator performing at least one simulation with the parameters characterising the temporal and/or spatial behaviour of the at least one simulated radio channel.

18. The measurement set-up of claim 17, wherein the filter is configured to form temporal sequences of impulse response estimates and/or spatial characteristics as parameters of the at least one radio channel,
 a simulator is configured to perform a simulation with the sequences of impulse response estimates and/or spatial characteristics of the at least one simulated radio channel.

19. The measurement set-up of claim 18, wherein the filter is configured to form the impulse response estimates at a constant rate as a function of time.

20. The measurement set-up of claim 18, wherein the filter is configured to increase the sample rate of the impulse response estimates by interpolation in order to limit a difference between two successive impulse response estimates.

21. The measurement set-up of claim 18, wherein the filter is a matched filter or a correlator configured to form the temporal sequences of the impulse response estimates and/or spatial characteristics.

22. The measurement set-up of claim 18, wherein the filter is configured to limit the number of propagation paths included in each impulse response of the radio channel and the simulator is configured to perform the at least one simulation using the propagation paths provided by the filter.

23. The measurement set-up of claim 17, wherein the filter is configured to cancel an effect of the transmitter on the parameters characterising a temporal and/or spatial behaviour of at least one simulated radio channel.

24. The measurement set-up of claim 17, wherein the filter is configured to cancel an effect of the receiver on the parameters characterising a temporal and/or spatial behaviour of at least one simulated radio channel.

25. An arrangement for a radio channel simulation of a wireless communication system, the arrangement comprising
 means for measuring at least one radio channel,
 means for storing the at least one radio channel measured, and
 means for performing digitally at least one simulation with the at least one radio channel stored.

26. The arrangement of claim 25, wherein the means for measuring are configured to measure the at least one channel as a function of time to define temporal and/or spatial behaviour of the radio channel, and
 the means for performing at least one simulation are configured to perform at least one simulation according to the temporal and/or spatial behaviour of the radio channel.

27. A measurement set-up for measuring a radio channel of a wireless communication system, the arrangement comprising
 means for transmitting,
 means for receiving, the means for transmitting being configured to transmit a signal to the means for receiving in at least one radio channel over an air interface of a wireless communication system during a period of time,
 means for forming digital samples of the signal received by the receiver, and
 means for saving the samples to be used to characterise a temporal and/or spatial behaviour of at least one simulated radio channel in a digital radio channel simulation.

28. An arrangement of a radio channel simulation of a wireless communication system, the arrangement comprising
 means for transmitting,
 means for receiving, the means for transmitting being configured to transmit a signal to the means for receiving in at least one radio channel over an air interface of a wireless communication system during a period of time,
 means for forming parameters characterising a temporal and/or spatial behaviour of at least one simulated radio channel based on the signal transmitted and the signal received during the period of time, and
 means for performing a simulation with the parameters characterising the temporal and/or spatial behaviour of the at least one simulated radio channel.

* * * * *